Oct. 6, 1964  S. S. STEIN  3,151,780
AUTOMATIC FEEDER FOR COMMINUTED FOOD
Filed Nov. 15, 1962  4 Sheets-Sheet 1

INVENTOR.
SAM S. STEIN
BY
Meyer, Baldwin, Doran & Egan
ATTORNEYS

Oct. 6, 1964 S. S. STEIN 3,151,780
AUTOMATIC FEEDER FOR COMMINUTED FOOD
Filed Nov. 15, 1962 4 Sheets-Sheet 2
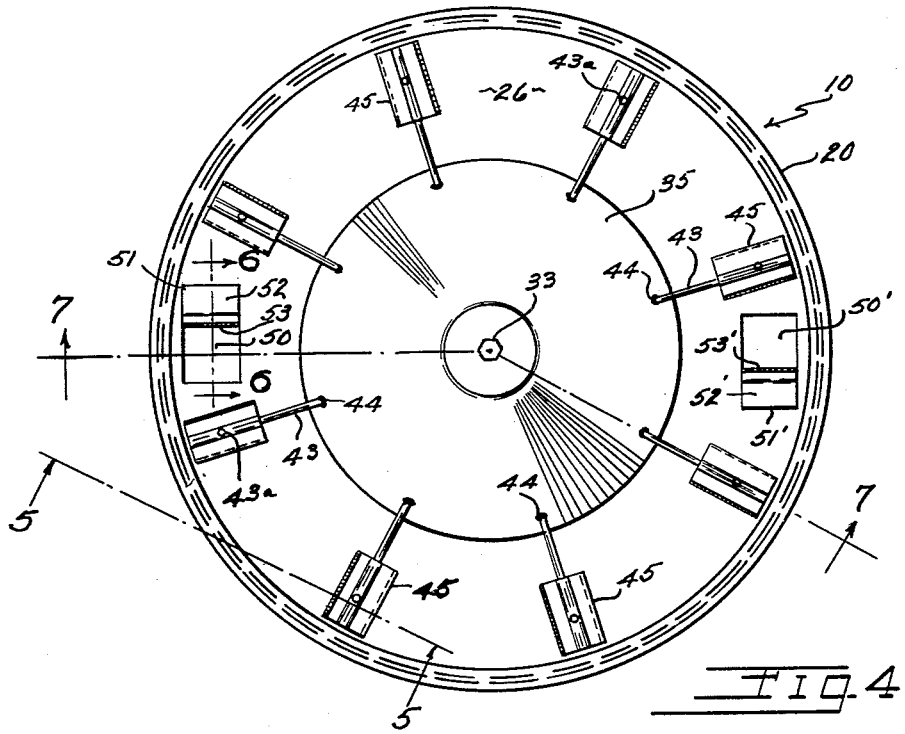
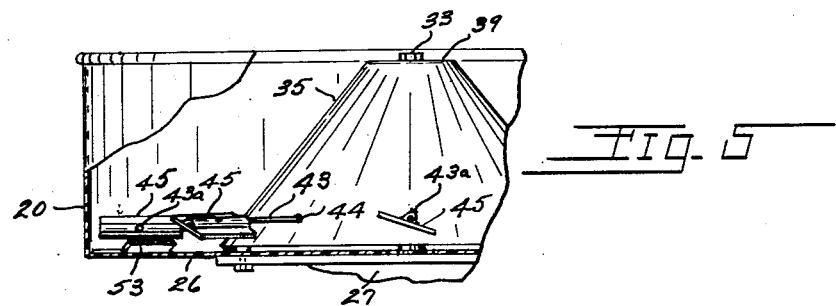
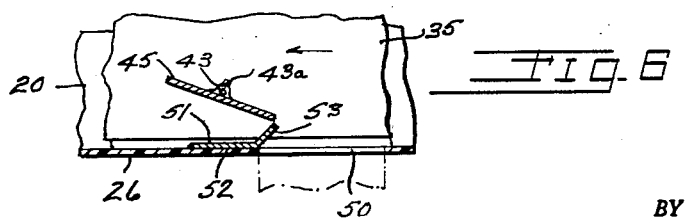
INVENTOR.
SAM S. STEIN
BY
Meyer Baldwin Doran & Egan
ATTORNEYS Oct. 6, 1964    S. S. STEIN    3,151,780
AUTOMATIC FEEDER FOR COMMINUTED FOOD
Filed Nov. 15, 1962    4 Sheets-Sheet 4
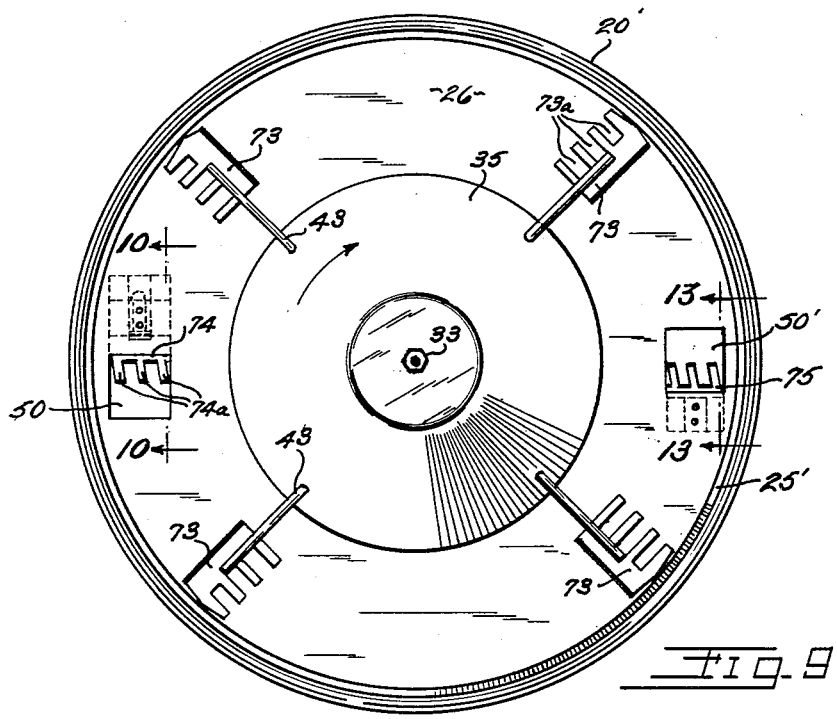
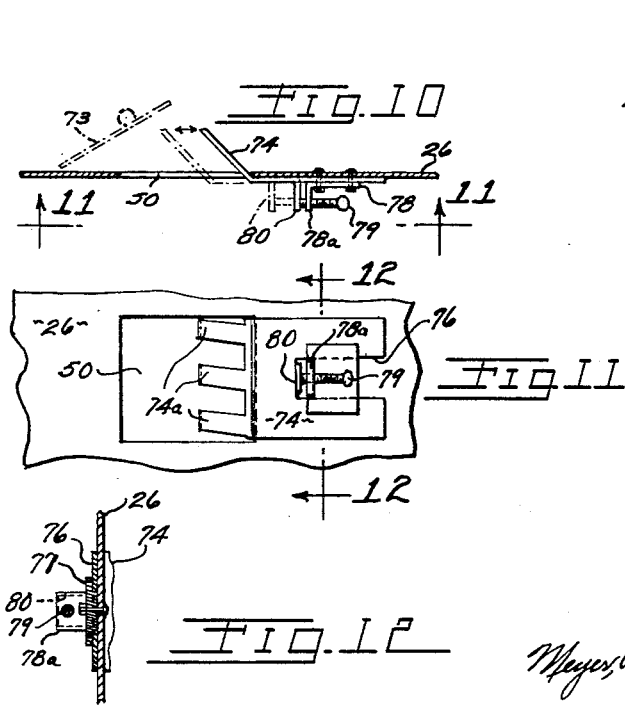
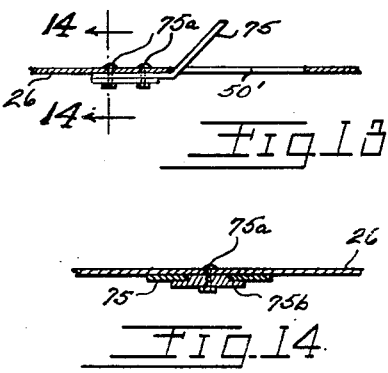
INVENTOR.
SAM S. STEIN United States Patent Office 3,151,780
Patented Oct. 6, 1964

3,151,780
AUTOMATIC FEEDER FOR COMMINUTED FOOD
Sam S. Stein, Sandusky, Ohio, assignor to Sam Stein Associates, Inc., Sandusky, Ohio, a corporation of Ohio
Filed Nov. 15, 1962, Ser. No. 237,866
11 Claims. (Cl. 222—185)

This invention relates to an automatic feeder apparatus for continuously delivering comminuted food such as meat, seafood, vegetables and the like, to one or more food forming machines.

Comminuted food forming machines are presently in common use and are devices adapted to continuously form variously shaped patties of meat and the like for subsequent freezing and storing or for immediate use in the preparation of sandwiches or other meals in restaurants and the like. The forming machines are adapted to operate at varying speeds and must be provided with a dependable supply of comminuted food to perform with maximum efficiency. It is the primary object of the present invention to provide an automatic feeder which effectively provides one or more forming machines with a sustained supply of comminuted food. The machine will be described for feeding comminuted meat to patty forming machines but it has other uses.

More specifically, the invention has an object the provision of a portable feeder apparatus of the above type which is movable into feeding position in relation to one or more comminuted food forming machines. It is also an object to provide such an apparatus which is simple in construction and may be readily and easily disassembled for the purpose of cleaning.

Another object of the invention is to provide feeder apparatus of the type set forth above which produces one or more continuous columns of nonpressurized comminuted food for feeding one or more food forming machines.

Further objects of the invention and the invention itself will become more readily apparent from a study of the appended description and the accompanying drawings, in which said drawings:

FIG. 4 is a top plan view of the hopper and internal working parts of the feeder apparatus;

FIG. 5 is a fragmentary view of the hopper in partial section as seen generally from the line 5—5 of FIG. 4;

FIG. 6 is a section taken along the line 6—6 of FIG. 4 but showing one of the paddle members rotated to a different position than shown in FIG. 4;

FIG. 9 is a top plan view similar to FIG. 4 but showing a modification of the invention;

FIG. 10 is an enlarged transverse sectional view taken along the line 10—10 of FIG. 9;

FIG. 11 is a bottom plan view of the structure shown in FIG. 10;

FIG. 12 is a fragmental sectional view taken along the line 12—12 of FIG. 11;

FIG. 13 is a fragmental sectional view, enlarged, taken along the line 13—13 of FIG. 9; and FIG. 14 is a fragmental sectional view taken along the line 14—14 of FIG. 13.

Figure 1:
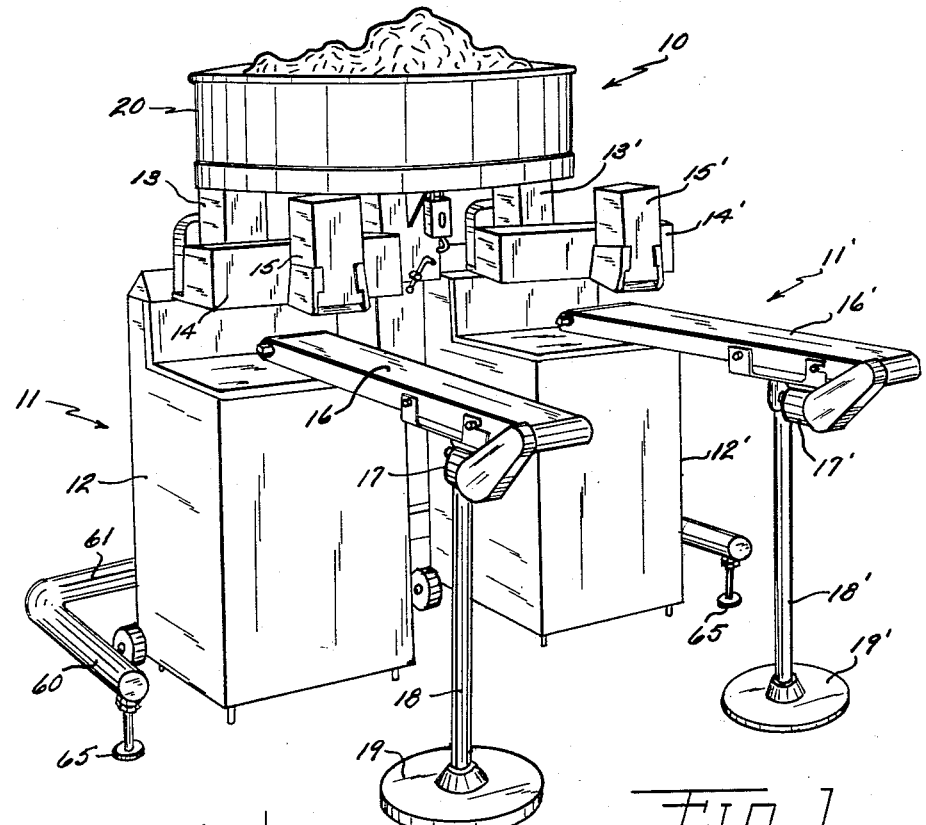
FIG. 1 is a perspective view of the feeding apparatus of this invention disposed adjacent to a pair of conventional ground meat forming machines in such position as to feed comminuted meat to said machines.

Referring now to the drawings and particularly to FIG. 1, the feeder apparatus of this invention is indicated generally at 10 and is illustrated in feeding position in relation to a pair of ground meat forming machines 11 and 11'. The forming machines comprise cabinets 12 and 12' upon which are mounted feed chutes 13 and 13', patty forming mechanisms 14 and 14', and paper feeders 15 and 15'. Conveyors 16 and 16' powered by motors 17 and 17' are mounted upon vertical supports 18 and 18' having enlarged bases 19 and 19'. One end of each conveyor 16 or 16' projects beneath a patty forming mechanism 14 or 14' and a paper feeder 15 or 15' for receiving freshly formed patties, separated by individual papers, which are dropped onto the conveyors. The machine may be run without papers. The patties are moved forwardly from the forming machine by the conveyors for further disposition such as packaging or the like. The cabinets 12 and 12' house motors and other suitable mechanism (not shown) for operating the forming machine in a conventional manner. It will be understood that these ground meat forming machines 11 and 11' are shown only by way of illustrating the function and purpose of the feeder apparatus 10 of this invention and constitute no part of the invention.

Figure 2:
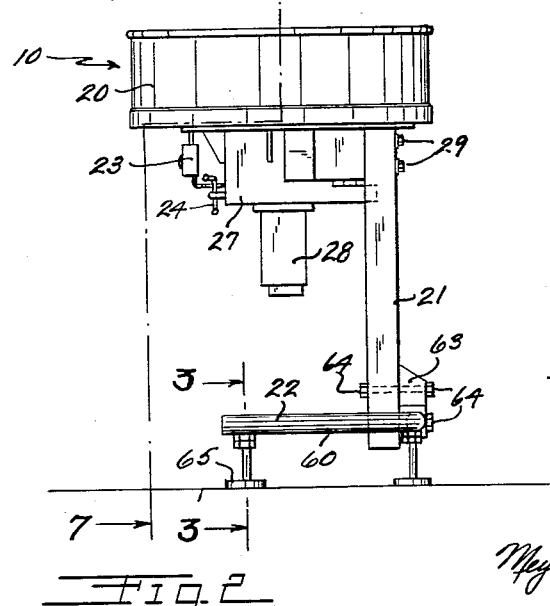
FIG. 2 is a side elevation of the feeding apparatus of this invention.
Figure 7:
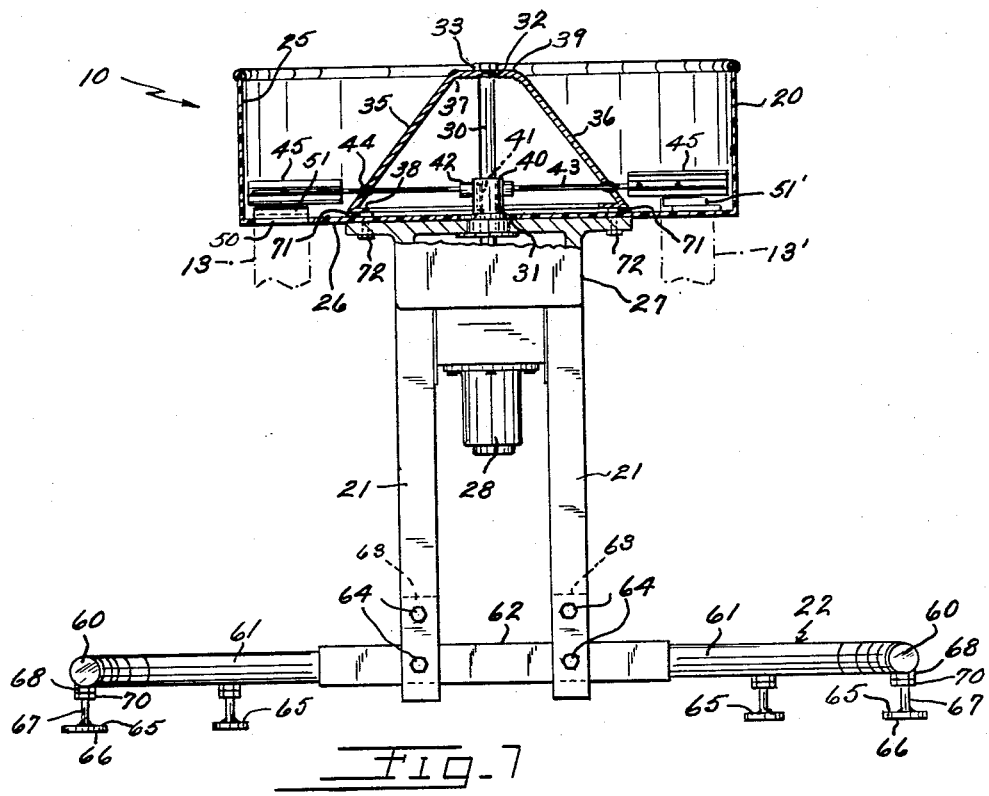
FIG. 7 is a partial section of the feeding apparatus taken along the line 7—7 of FIG. 2.

Referring now to FIGS. 2 and 7, the feeder apparatus 10 of this invention comprises a drumlike hopper 20 supported from the bottom adjacent to one peripheral edge portion by a pair of upright legs 21 the lower ends of which are secured to a horizontally disposed, U-shaped bottom support 22.

The drumlike hopper 20, as herein illustrated, is preferably made of reinforced plastic (but it could be of other suitable material) and is cylindrical in horizontal section having an upstanding, annular wall 25 and a flat, circular base 26. Said base is mounted upon a forwardly projected transmission housing 27 which is secured by bolts 29 to the upper end portions of the legs 21. Below said transmission housing there is mounted an electric motor 28 adapted to power the feeder apparatus 10 through a suitable variable speed transmission (not shown) mounted within the transmission housing 27.

A drive shaft 30 projects upwardly out of the transmission housing 27 through a central aperture 31 in the base 26. Said drive shaft extends upwardly substantially the height of the annular wall 25 and is provided at its upper end portion with a diametrically reduced portion 32 having thread fitted thereupon a nut 33.

The shaft 30 supports a cone or spreader 35 preferably made of stainless steel sheet metal and having a downwardly diverging, circumferentially continuous wall 36, the bottom circumference of which is substantially smaller than the internal diameter of the hopper 20. The cone 35 is frusto-conical in shape having a flat top 37 at its upper end and an inwardly turned, annular flange 38 at its lower end. An aperture 39 in top 37 fits over the reduced portion 32 of the drive shaft 30. The nut 33 holds the cone 35 securely in place upon said shaft.

A continuous circular nylon seal 71, about ¼" high, is positioned between flange 38 and the bottom of hopper 20. It is positioned by the heads of a circular ring of hold-down bolts 72 where they project above the bottom of the hopper. Nut 33 holds a slight pressure on seal 71.

The lower end of the drive shaft 30 just above the base 26 carries a heavy, sleevelike hub 40 which is telescoped over said drive shaft and keyed thereto by a key 41. The hub 40 has a plurality of circumferentially evenly spaced, radiating socket members 42 each of which supports the inner end of a rod 43 secured thereto.

The radiating rods 43 project outwardly through suitable apertures in the wall 36 of the cone 35; which said apertures may be welded or soldered where the rods project through the cone as indicated at 44. The distal ends of said rods, which project outwardly beyond the cone 35, carry flat, rectangular paddles 45 which are suitably secured to the respective rods as by set screws 43a. The cone 35 with its associated rods and paddles is rotatably driven within the hopper 20 by means of the motor 28 and the intervening transmission of the transmission housing 27 whereby said paddles sweep a circumferential path provided around said cone defined by the exposed portion of the base 26 as seen in FIG. 4. Preferably, but not necessarily, the transmission permits speed variation. A preferred form of comb paddle is shown in FIGS. 9 to 14.

Referring now to FIGS. 4–6, the base is provided with a pair of diametrically oppositely disposed, rectangular apertures 50 and 50'. Said apertures are disposed adjacent to the annular wall 25 between the cone 35 and said wall generally in the path of the rotating paddles 45 and have two parallel edges thereof disposed substantially crosswise of the path. A scraper 51 or 51' is mounted adjacent to one of the crosswise edges of an aperture 50 or 50', respectively. Assuming that the rotary movement of the cone 35 is clockwise as shown by the arrow in FIG. 4, the scrapers 51 and 51' are mounted adjacent to the edges of the apertures 50 and 50', respectively, which are downstream or away from the direction of movement of the paddles 45. As shown in FIG. 6, each scraper 51 or 51' comprises a flat base 52 or 52' and an obliquely upwardly directed blade 53 or 53' which is parallel with the adjacent aperture edge and juts outwardly over the aperture. The paddles 45 are preferably not much longer in their radial dimension than the width of said apertures 50–50' or the length of said blades 53–53'.

The upright legs 21 may be of any suitable construction and as herein illustrated comprise a pair of vertically disposed, laterally spaced, tubular members of heavy rectangular section. The U-shaped bottom support 22 comprises a pair of horizontally disposed, forwardly extending arms 60 having right angularly turned, inwardly directed extensions 61, and the inner ends of the extensions 61 are welded respectively to the ends of a center member 62. The center member 62 is preferably rectangular in section, and the extensions and arms, as herein illustrated, are of circular tubular construction. The center member 62 has a pair of upright, preferably rectangular brace members 63 welded to the upper surface thereof and spaced the same distance apart as the legs 21. Said legs are disposed with their rearwardly directed surfaces flatwise against the forward faces of the center member and the upright brace members and are securely bolted thereto by means of bolt and nut assemblies 64.

The bottom support 22 has a plurality of vertically adjustable support pads or casters 65 two of which are disposed adjacent to the distal ends of the arms 60 and two of which are disposed in the extensions 61 of said arms. All of the support pads 65 are mounted to the arms 60 in the same manner and are of identical construction and, therefore, only one such pad will be described in detail.

Figure 3:
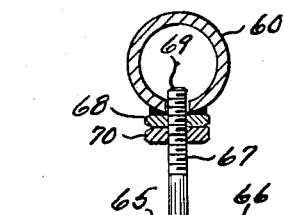
FIG. 3 is a section taken along the line 3—3 of FIG. 2.

FIG. 3 shows one of the support pads 65 in detail, and said pad comprises a disk shaped base 66 having a centrally disposed, vertically upwardly directed, threaded shaft 67. The upper end of said shaft is thread fitted into an adjusting nut 68 which is welded or otherwise suitably secured to the lower surface of the arm 60. The wall of the tubular arm is suitably apertured at 69 whereby the extreme upper end of the shaft 67 can project upwardly into the hollow arm. By rotation of the different support pads 65 in either direction, minute adjustments are made in the vertical height of the bottom support 22 whereby to position the hopper 20 at exactly the correct height for servicing the ground meat forming machines 11. By variously adjusting the different pads 65, the hopper may be leveled. Lock nuts 70 are provided immediately below the adjusting nuts 68 for firmly holding the pads 65 in any desired adjusted position.

For operating purposes, the comminuted meat forming machines 11 are positioned within the area defined by the U-shaped bottom support 22 whereby their feed chutes 13 and 13' are positioned directly beneath the rectangular apertures 50 and 50' respectively of the base 26 of the hopper 20. A starting switch 23 provides means for starting the motor 28 whereby the cone or spreader 35 and its associated paddles 45 are rotated in a clockwise direction as seen in FIG. 4. A speed controller 24 is provided at the transmission housing 27 whereby the speed of the cone and associated paddles may be varied to meet the requirements of the ground meat forming machines 11 and 11'.

The drumlike hopper 20 is initially filled with comminuted or ground meat, and the feeder apparatus 10 is then set in motion. The paddles 45 are submerged in the meat and move in an arcuate path around the hopper adjacent to the annular wall 25 thereof, said paddles periodically passing over the rectangular apertures 50 and 50'. The paddles approach each said aperture from the edge thereof opposite the associated scraper blade 51 or 51' and are angled with their leading edges disposed upwardly and their trailing edges disposed downwardly thereby tending to impel the ground meat in a circular motion in the same direction as the paddles are moving.

Figure 8:
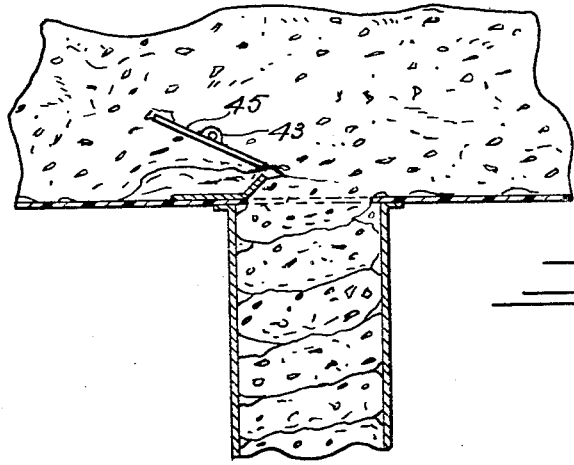
FIG. 8 is a view similar to FIG. 6 illustrating the manner in which the meat product is deposited into a feed chute of a meat forming machine.

As illustrated in FIG. 8, each time one of the paddles passes an aperture 50 or 50', a certain amount of the meat is separated from the main body of meat by a blade 53 or 53' and allowed to drop downwardly into the associated chute 13 or 13' due to the fact that the blades have their edges disposed only a short distance below the trailing edges of the paddles. The paddles follow each other in rapid succession, and a constant supply of downwardly dropping portions of meat is provided to the forming machines. The effect, in the form of the invention herein illustrated, is to provide two columns of ground meat moving downwardly at a controlled rate depending upon the speed at which the feeder apparatus is operated.

One of the advantages of this invention is that the ground meat is not pressurized as it moves downwardly into the pattymaking machines. Any pressure exerted on the meat tends to compress it and eliminate air from within the mixture resulting in a more compact patty which has poorer eating characteristics. As shown in FIG. 8, the action of the apparatus here disclosed is that of merely separating quantities from the main body of the meat which is rotating in the feeder and allowing these portions to fall downwardly in a substantially continuous ribbon or column moving into the feeder chute of a patty making machine. This column does not completely fill the cross section of the chute, as would be the case if it were pressurized therein, but instead falls freely through the chute with air spaces provided in and between the falling portions.

It will be readily appreciated that the feeder apparatus of this invention may be adapted, by the provision of only one rectangular aperture, for feeding a single forming machine. Said apparatus may also be adapted to feed more than two forming machines by providing more rectangular apertures and a hopper of larger dimension whereby to make room for more forming machines thereunder.

In actual practice of the present invention in connection with the feeding of two forming machines as illustrated in FIG. 1, excellent results are obtained by the use of a hopper having an internal diameter of 41" to 43" and having mounted therein a cone which is 24" in diameter at the bottom and has an upwardly converging wall disposed at 55° relative to the annular path around the cone. This provides an 8½" to 8¾" wide path around the cone, and the paddles, here shown as eight in number, have radial dimensions of about 5° with a 3" to 4" dimension in the general direction of travel of the paddles. These paddles are about 1/8" thick and are disposed at an angle of 20° to the horizontal. It is found that the angle of these solid paddles may be varied plus or minus 5° and still retain efficient operation.

The trailing edges of the paddles in the example illustrated are disposed 3/4" above the bottom of the hopper, and the scraper blades are disposed at a 45° angle and are of such height as to allow 1/16" clearance between the blades and the trailing edges of the paddles. The paddles 45 are connected to the rods 43 across the middle of the paddles at a position about 13/16" above the bottom of the hopper, and said hopper is provided with an annular wall 12" high. This wall may be inclined upwardly and outwardly at 2½° to the vertical to give a little better results.

Forming machines in current use are adapted to form thirty-six to sixty meat patties per minute. The feeder apparatus of this invention, in the embodiment illustrated, is adapted to feed comminuted meat through each aperture 50—50' at a rate sufficient to supply these current forming machines. However, by changing the transmission in the housing 27 or by varying the speed of the motor 28 it will be readily understood that this rate may be increased to feed forming machines of even greater capacity as, for example, machines capable of forming ninety to one hundred patties per minute.

The modification of this invention shown in FIGS. 9 through 14 is utilized in the same machine already described and similar parts are given similar reference characters. The only difference in this modification from that already described is the form of the paddles which press the finely divided material down through the hopper openings and the arrangement of the scraper blades at the edge of the discharge openings.

Referring to FIG. 9, the generally cylindrical hopper 20' for holding the finely divided food material has an upstanding annular wall 25' here indicated as sloping outwardly and upwardly from the bottom 26 at an angle of about 2½° to the vertical. The hopper has a circular base 26 of annular form as previously described. The central cone 35 is exactly like that previously described and is held upon the drive shaft by the nut 33, all as shown previously. Here, four radially extending rods 43 are shown instead of the eight indicated in FIG. 4. To each of these radially extending rods is rigidly attached, by welding or other suitable means, a comb-shaped paddle 73. In one actual embodiment where the blades is 5 1/8" measured radially and about 4" measured at right angles thereto, there are three comb-like structures having slots 7/8" wide and 2 1/8" deep measured from the trailing edge of the blade with metal about 5/8" wide between adjacent slots. Each paddle is a little over 1/8" thick and is fastened to the rod 43 at an angle of about 45° to the horizontal which may vary plus or minus 5° and still give satisfactory operation. Each of these paddles slopes rearwardly and downwardly from the leading edge and where the center of each rod 43 is about 1 3/4" from the bottom 26 of the hopper, the trailing edge of each paddle is about 1/8" below the bottom of the cone 35 and 1/8" above the hopper bottom 26.

Fastened to the downstream side of each of the discharge openings 50 and 51 is a scraper blade 74 or 75 respectively, generally complementary in form to the comb-shaped paddles 73 for the purpose of scraping the loose food material from the paddle as it passes over the discharge opening. In the present embodiment, each scraper blade has three outstanding prongs 74a adapted to fit into the three slots 73a of each paddle 73 as it goes past and scrape the meat from it. In the embodiment mentioned before, the prongs 74a are about 5/8" wide and adapted to fit into the slots 73a which are approximtaely 7/8" wide, measured in a radial direction. The blades 74 and 75 are inclined upwardly from the bottom of the hopper 26 at an angle opposed to the angle of the paddles 73, which paddles travel in the direction of the arrows indicated FIGS. 9, 10 and 13. Preferably the inclination of the scrapers 74 and 75 is about 45° to the horizontal.

It will be noted in FIG. 13 that the scraper blade 75 is secured in fixed position to the hopper bottom 26 by means of bolts 75a. Preferably, but not necessarily, the scraper 74, or both blades if desired, are arranged to be adjustably movable across the opening 50, or 51' as the case may be. To this end, blade 74 is slotted as indicated at 76 in FIG. 11 and a clip 77 is secured by bolts 78 to the hopper bottom 26 to hold a depending flange 78a through which is threaded a thumb screw 79. The end of this screw abuts a flange 80 depending from blade 74 and the pressure of the meat forces the blade 74 so that flange 80 is always held in engagement against the end of thumb screw 79. This permits the blade 74 to have its non-slotted portion moved partially across the opening 50, thus reducing the amount of comminuted food material which drops through the opening 50 at each passage of one of the blades 73. This adjustable structure is useful to take care of food forming machines of different capacity located beneath the openings 50 or 50'.

This adjustability of scraper blades 74 and 75 could also be applied to scraper blades 51 and 51' of the first described form of apparatus.

The foregoing has been given as an excellent form of the invention. It will be understood that many changes may be made in the invention as herein disclosed without, however, departing from the spirit thereof or the scope of the appended claims.

What is claimed is:

1. A feeder apparatus comprising a hopper, a rotatable spreader having a generally frusto-conical form mounted concentrically in said hopper with the large end down; said hopper having base means defining an annular path around the bottom periphery of said spreader; said base means having at least one discharge opening therein disposed in said path; said spreader having a base adjacent the base means of such a size that the diameter of the base is at least half the length of the internal diameter of the hopper, a plurality of paddle means mounted to and radiating from the spreader near the base thereof in such manner as to move around said path when the spreader therein is disposed in the path, the spreader and paddle means being effective to move a substantially continuous ribbon of comminuted food over the spreader and into and around the path to deliver said ribbon to the opening, said paddle means comprising a plurality of substantially flat paddles, each paddle disposed at an angle so that the leading edge is disposed higher than the trailing edge, a scraper blade mounted at one edge of the opening downstream from the direction of movement of the paddles, the upper edge of the scraper blade being closely spaced below the trailing edges of the moving paddles, the scraper blade projecting upwardly from the base means and angled upstream over the opening, and the inclination of said paddles and of said scraper blade being such as to press a predetermined amount of comminuted food downward through the opening each time a paddle means passes thereover.

2. A feeder apparatus as set forth in claim 1 including upright support means mounted adjacent to one edge of said hopper; the lower end of said support means secured to a central portion of a U-shaped bottom support; said bottom support having arms projecting horizontally in the direction of said hopper; said bottom support defining a general area within which the forming machine is positioned in such manner as to be disposed beneath said aperture.

3. A feeder apparatus as set forth in claim 2 wherein said base has at least two of said apertures, and associated scraper blades disposed at different position in said annular path whereby said apparatus supplies meat to at least two forming machines.

4. A feeder apparatus as set forth in claim 2 wherein said bottom support has vertically adjustable support pads mounted to said arms and said central portion whereby to level said hopper and adjust the height thereof relative to the forming machine.

5. A feeder apparatus for feeding comminuted meat to a meat forming machine comprising a stationary, cylindrical hopper for containing the meat; said hopper having an upwardly converging, rotatable spreader cone disposed centrally therewithin, the cone having a base with a diameter that is about $24/41$ to $24/43$ of the length of the internal diameter of the hopper; said hopper having a base defining an annular path around the periphery of the base of said cone; a plurality of paddles mounted to and radiating from said cone into said path and submerged in loose, comminuted meat in use of said apparatus; said apparatus having means for rotating said cone and paddles in one direction; said paddles angled with their leading edges higher than their trailing edges at an angle of about 40° to 50° with the horizontal; said base having an aperture therein disposed in said path over which said paddles sequentially pass; a scraper blade mounted adjacent to an edge of said aperture and having a portion extending partially over said aperture; said scraper blade inclined upwardly generally upstream of the paddle movement; means for adjusting the extension of the scraper over the opening whereby the amount of meat passing therethrough can be varied; the trailing edges of said paddles passing slightly above said blades whereby said blades remove chunks of said meat from beneath each paddle as it passes thereover and allows said chunks to drop downwardly through said aperture to be received by a forming machine.

6. A feeder apparatus as set forth in claim 5 wherein each of said paddles is of comb-shape and the scraper has surfaces generally complementary to the comb-shape of the paddles.

7. A feeder apparatus as defined in claim 5 in which the hopper is fixed, and the spreader and paddles are mounted for rotation together relative to said hopper.

8. A feeder apparatus as set forth in claim 7 wherein the trailing edge of each of said paddles is approximately ⅛ inch above said base of said hopper.

9. A feeder apparatus comprising a hopper, a rotatable spreader having a generally frusto-conical form mounted concentrically in said hopper with the large end down; said hopper having base means defining an annular path around the bottom periphery of said spreader; said base means having at least one discharge opening therein disposed in said path; a plurality of paddle means mounted to and radiating from the spreader near the base thereof and over said path in such manner as to move around said path and across said opening when the spreader therein is rotated, said paddle means all mounted at the same height above said base means in a single horizontal zone, the spreader and paddle means being effective to move a substantially continuous ribbon of comminuted food over the spreader and into and around the path to deliver said ribbon to the opening, said paddle means comprising a plurality of substantially flat paddles, each paddle disposed at an angle so that the leading edge is disposed higher than the trailing edge, a scraper blade mounted at one edge of the opening downstream from the direction of movement of the paddles, the upper edge of the scraper blade being closely spaced below the trailing edges of the moving paddles, the scraper blade projecting upwardly from the base means and angled upstream over the opening, and the inclination of said paddles and of said scraper blade being such as to press a predetermined amount of comminuted food downward through the opening each time a paddle means passes thereover.

10. An apparatus as defined in claim 9 in which each of the paddles is inclined with respect to the horizontal at an angle of about 15° to 25° with the horizontal.

11. An apparatus as defined in claim 9 in which each of the paddles is comb-shaped and inclined at an angle of about 40° to 50° with the horizontal.

References Cited in the file of this patent

UNITED STATES PATENTS

| | | |
|---|---|---|
| 1,488,074 | Soine et al. | Mar. 25, 1924 |
| 1,620,320 | Bilbrey | Mar. 8, 1927 |
| 1,703,032 | Gorman et al. | Feb. 19, 1929 |
| 1,953,928 | Colver | Apr. 10, 1934 |
| 2,343,757 | Egedal | Mar. 7, 1944 |
| 2,517,107 | Hessert | Aug. 1, 1950 |
| 2,542,244 | Gerhardt et al. | Feb. 20, 1951 |
| 2,574,231 | Sinden | Nov. 6, 1951 |